June 14, 1932. O. CAREY 1,863,187

MUD HOOK

Filed April 22, 1931

INVENTOR
Orville Carey
BY U. G. Charles
ATTORNEY

Patented June 14, 1932

1,863,187

UNITED STATES PATENT OFFICE

ORVILLE CAREY, OF VALLEY CENTER, KANSAS

MUD HOOK

Application filed April 22, 1931. Serial No. 531,904.

My invention relates to improvements in mud hooks.

The object of my invention is to provide mud hooks for the tire of a motor driven vehicle. A further object of my invention is to provide mud hooks that can be applied to the tire without hoisting the wheel from the ground.

A still further object of my invention is to provide a plurality of mud hooks that is easily applied to the tire of a disc wheel.

A still further object of my invention is to provide mud hooks having a stem radially positioned with respect to the wheel, and means to bind a plurality of the hooks to snug engagement on the tire, the binding means operative at the outside of the wheel.

A still further object of my invention is to provide a plurality of mud hooks, each having an arcuate portion to engage on the tire of the wheel, and a stem integral with the arcuate portion and being connected by chains extending from one stem to the other in opposite directions functioning as a cantilever tensioning the hooks radially inward for snug engagement on the tire.

These and other objects will hereinafter be more fully explained, reference being had to the accompanying drawing forming a part of this specification, and in which like characters will apply to like parts in the different view, and in which.

Figure 1:
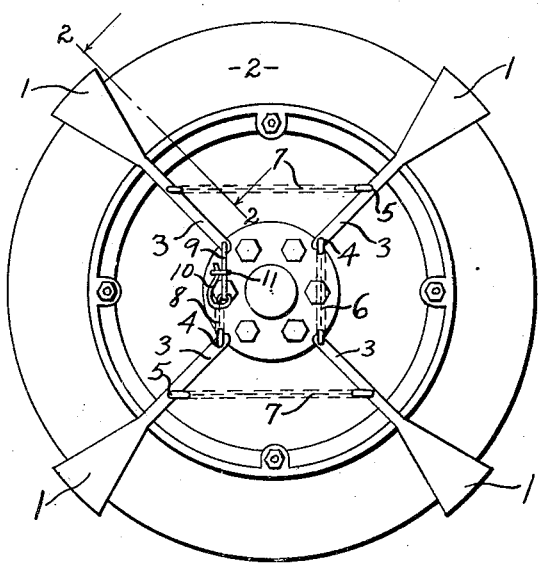
Fig. 1 is an outside view of a wheel having the hooks applied.
Figure 2:
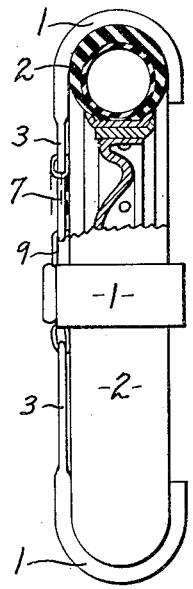
Fig. 2 is a transverse view partly in section taken on line 2—2 in Fig. 1.
Figure 3:
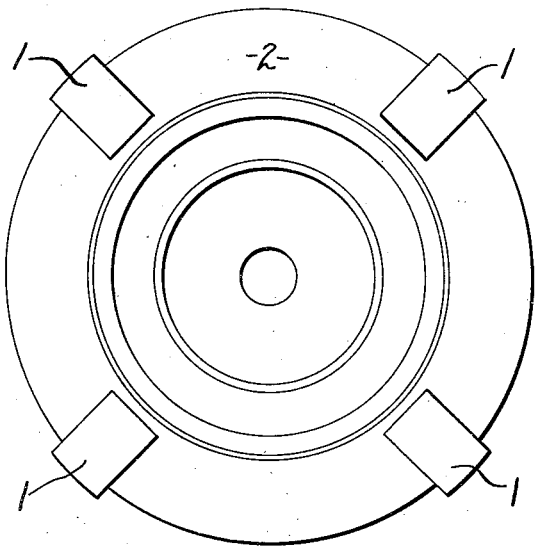
Fig. 3 is an inside view of Fig. 1.
Figure 4:
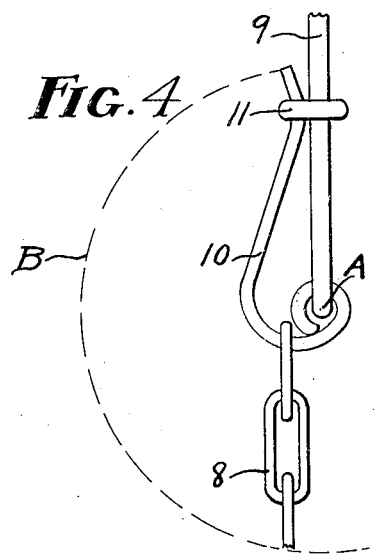
Fig. 4 is an enlarged detail view of the chain tensioning means.

The invention herein disclosed consists of an arcuate hook element 1, the form of which is arranged to engage snugly on a tire 2 of the wheel of a motor driven vehicle.

Tangentially extending from the arcuate portion and integral therewith is a stem 3 radially positioned with respect to the wheel. In the end of the stem and intermediate thereof are apertures 4 and 5 adapted to receive the end link of chains 6 and 7 respectively. The said chains may be varied in length by removing or placing links therein.

As a tensioning means for all of the chains simultaneously, I have provided a connecting member for two of the adjacent stems at the inner ends thereof. The said member comprising a chain portion 8 and a link portion 9, the said link portion having a hook 10 rockably carried on the inner end thereof as at A, the hook adapted to engage with the inner end link of the said chain portion 8 as tensioning means for the said chain and link portions toward each other longitudinally, carrying with them their respective ends of the stem. The hook being secured in a closed position by a loop 11 slidably engaging on the link portion 9, and when detached the rocking movement of the hook is shown by dotted line B.

The chains being thus tensioned is means to cause an inward movement of each of the hook elements simultaneously and to support the stems thereof radially so that the arcuate hook portion will uniformly engage snugly on the tire to avoid longitudinal movement along the periphery thereof, and the said hook portion being wide and thick will cleave to the soft earth moving the vehicle onward.

When the hook 10 is detached from its respective chain portion, the hook elements are free to move outward sufficient to remove or place the same on the tire. This arrangement is very convenient for disc wheels as all adjustments as well as placing the hooks may be performed at the outside of the wheel and without raising the same from the ground or driving the wheel in either direction.

While I have shown a hook on one side of the wheel hub, I do not wish to be restricted to the same as a similar hook may be placed on the other side, and the size of the arcuate hook portion may be varied in width and thickness, and such other modifications may be employed as lie within the scope of the appended claim.

Having fully described my invention what I claim as new and desire to secure by Letters Patent is:—

In mud hooks for the tire of a wheel, a plurality of arcuate hooks to engage on the tire, each hook having a stem with an aperture extending thru and near the end thereof and an aperture thru the stem between the hook and the first mentioned aperture, a chain connecting one pair of the stems at the end apertures, another pair being connected to a chain and link detachably arranged, the pairs being connected by other chains transversely positioned to the first said chain and detachable chain and link, the last said chains engaging with the intermediate apertures of their respective chains by which means all of the hook portions are tensioned to snug engagement on the tire, substantially as shown.

In testimony whereof I affix my signature.
ORVILLE CAREY.